United States Patent
Zhang et al.

(10) Patent No.: US 8,484,318 B2
(45) Date of Patent: Jul. 9, 2013

(54) METHOD, APPARATUS AND SYSTEM FOR UPGRADING THROUGH MULTICAST

(75) Inventors: Xiaotian Zhang, Wuhan (CN); Junxia Xu, Shenzhen (CN)

(73) Assignee: Huawei Device Co., Ltd., Shenzhen ( * ) Notice: Subject to any disclaimer, the term of this patent is extended or adjusted under 35 U.S.C. 154(b) by 171 days.

(21) Appl. No.: 13/052,566

(22) Filed: Mar. 21, 2011

(65) Prior Publication Data

US 2011/0185044 A1 Jul. 28, 2011

Related U.S. Application Data

(63) Continuation of application No. PCT/CN2009/073640, filed on Aug. 31, 2009.

(30) Foreign Application Priority Data

Sep. 22, 2008 (CN) .......................... 2008 1 0216303

(51) Int. Cl.
*G06F 15/16* (2006.01)
*G06F 15/173* (2006.01)

(52) U.S. Cl.
USPC ........... 709/219; 709/223; 709/213; 709/224; 709/232; 709/238; 370/231; 370/401; 370/229; 370/312; 370/390

(58) Field of Classification Search
USPC .......................................... 709/217–219, 232
See application file for complete search history.

(56) References Cited

U.S. PATENT DOCUMENTS

| | | |
|---|---|---|
| 5,666,293 A | 9/1997 | Metz et al. |
| 6,614,804 B1 | 9/2003 | McFadden et al. |

(Continued)

FOREIGN PATENT DOCUMENTS

| | | |
|---|---|---|
| CN | 1996894 A | 7/2007 |
| CN | 101114884 A | 1/2008 |
| CN | 101162954 A | 4/2008 |
| WO | WO 2008/013393 A1 | 1/2008 |

OTHER PUBLICATIONS

International Search Report from the Chinese Patent Office in International Application No. PCT/CN2009/073640 mailed Dec. 10, 2009.

Written Opinion of the International Searching Authority in International Application No. PCT/CN2009/073640 mailed Dec. 10, 2009.

(Continued)

*Primary Examiner* — Jude Jean Gilles

(74) *Attorney, Agent, or Firm* — Conley Rose, P.C.; Grant Rodolph; Nicholas K. Beaulieu

(57) ABSTRACT

A method for upgrading a device through multicast is disclosed. The method includes: monitoring a common channel of a multicast server, where information about all subfiles of a current packaged mirror file is multicast in the common channel; obtaining information about a subfile required for upgrading the device from packets in the common channel, where the information includes an address of a subchannel that bears the subfile on the multicast server; and switching to the subchannel according to the address of the subchannel that bears the subfile required for upgrade, receiving the subfile multicast in the subchannel, and validating the subfile. Further, an apparatus and system for upgrading a device through multicast are disclosed. The technical solution under the present invention can upgrade both a single-system or single-module device and a multi-system or multi-module device through multicast, the time required for upgrading the devices is reduced, and the upgrade status of the devices can be tracked in real time.

20 Claims, 3 Drawing Sheets

U.S. PATENT DOCUMENTS

| | | | |
|---|---|---|---|
| 6,874,046 B1* | 3/2005 | LeCrone et al. | 710/74 |
| 7,818,734 B2* | 10/2010 | Giannini et al. | 717/168 |
| 7,969,979 B2* | 6/2011 | Fuchs et al. | 370/390 |
| 2005/0202808 A1 | 9/2005 | Fishman et al. | |
| 2007/0118617 A1 | 5/2007 | Lee et al. | |
| 2007/0211720 A1* | 9/2007 | Fuchs et al. | 370/390 |
| 2008/0016543 A1 | 1/2008 | Kwon | |
| 2008/0092197 A1 | 4/2008 | Koh | |
| 2008/0146219 A1 | 6/2008 | Habermas et al. | |

OTHER PUBLICATIONS

Extended European Search Report dated (mailed) Jan. 23, 2012, issued in related Application No. 09814024.7-2416 , PCT/CN2009073640, Hauwei Technologies Co., Ltd.

Chinese Rejection Decision mailed Sep. 21, 2011, in related Chinese Application No. 200810216303.1, Huawei Technologies Co., Ltd.

First Chinese Office Action dated (mailed) Feb. 28, 2011, issued in related Chinese Application No. 200810216303.1 Huawei Technologies Co., Ltd.

* cited by examiner

METHOD, APPARATUS AND SYSTEM FOR UPGRADING THROUGH MULTICAST

CROSS-REFERENCE TO RELATED APPLICATIONS

This application is a continuation of International Application No. PCT/CN2009/073640, filed on Aug. 31, 2009, which claims priority to Chinese Patent Application No. 200810216303.1, filed on Sep. 22, 2008, both of which are hereby incorporated by reference in their entireties.

FIELD OF THE INVENTION

The present invention relates to communication technologies, and in particular, to a method, apparatus, and system for upgrading through multicast.

BACKGROUND OF THE INVENTION

A device generally needs to be upgraded while being manufactured, used or repaired. If all devices are upgraded manually one by one, the upgrade is almost impossible when the number of devices to be upgraded is enormous. For example, it is impossible to manually upgrade the devices stored in the warehouse or a large batch of devices under repair. Therefore, a device upgrade method that upgrades devices in large batches is required.

Multicast is a new technology that transfers data from one point to multiple points. If the multicast technology is applied to device upgrade, batch upgrade of devices may come true. When the devices are upgraded in batches through the multicast technology, a multicast server keeps multicasting a mirror file intended for upgrading devices, and the devices to be upgraded receive the mirror file from the multicast server after being powered on, and are upgraded successfully after the mirror file is validated. In this way, a large batch of devices can be upgraded as long as the multicast server keeps multicasting the mirror file for upgrade cyclically.

In the process of upgrading devices in batches, the multicast server keeps multicasting the mirror file for upgrade cyclically, and multicasts the mirror file in segments at specified intervals. While multicasting the packet of the mirror file, the multicast server multicasts the version information of the mirror file at intervals. The device to be upgraded knows whether the device needs to be upgraded by using the multicast mirror file only after receiving the version information.

In the process of implementing the present invention, the inventor finds that the multicast server in the conventional art has to keep multicasting the mirror file for upgrade cyclically when upgrading devices in batches. If the multicast server multicasts a single mirror file cyclically, only the devices of a single system can be upgraded; if the multicast server multicasts multiple mirror files cyclically, it takes too much time to upgrade the devices no matter whether the multicast server multicasts multiple mirror files alternately or multicasts a mirror file cyclically repeatedly and then multicasts the remaining mirror files. Therefore, the conventional art makes it difficult to upgrade a multi-system or multi-module device through multicast.

SUMMARY OF THE INVENTION

The embodiments of the present invention provide a method for upgrading through multicast to fulfill these objectives: A multicast server can upgrade both a single-system or single-module device, and a multi-system or multi-module device through multicast, the time required for upgrading the devices is reduced, and the upgrade status of the devices can be tracked in real time.

Further, the embodiments of the present invention provide an apparatus and system for upgrading through multicast.

The objectives of the present invention are fulfilled through the following technical solution:

A method for upgrading a device through multicast in an embodiment of the present invention includes:

monitoring a common channel of a multicast server, where information about all subfiles of a current packaged mirror file is multicast in the common channel;

obtaining information about a subfile required for upgrading the device from packets in the common channel, where the information includes an address of a subchannel that bears the subfile on the multicast server; and switching to the subchannel according to the address of the subchannel that bears the subfile required for upgrade, receiving the subfile multicast in the subchannel, and validating the subfile.

A multicast server provided in an embodiment of the present invention includes:

a multicasting module, adapted to multicast packets through a common channel and subchannels; and a processing module, adapted to: configure content of the packets multicast in the common channel and the subchannels of the multicasting module, and more specifically, configure the common channel to multicast information about all subfiles of a current packaged mirror file, and configure the subchannels to multicast the subfiles.

A device provided in an embodiment of the present invention includes: a receiving module, adapted to receive multicast packets in a common channel and subchannels; and a processing module, adapted to: obtain an address and a port of a subchannel that bears a required subfile from the multicast packets in the common channel; switch to the subchannel, and receive the multicast packets in the subchannel through the receiving module; and validate a received mirror file for upgrade.

A system for upgrading through multicast in an embodiment of the present invention includes a device that receives packets multicast by a multicast server.

The device is adapted to: monitor a common channel of the multicast server; obtain information about a subfile required for upgrading the device from packets in the common channel; switch to the subchannel that bears the subfile according to information about the subfile; and receive the subfile in the subchannel, and validate the subfile.

Another system for upgrading through multicast in an embodiment of the present invention includes a multicast server that multicasts packets to a device.

The multicast server is adapted to: multicast a current packaged mirror file, and more specifically, multicast information about all subfiles of the current packaged mirror file through a common channel of the multicast server, and multicast the subfiles through subchannels of the multicast server.

With the method, apparatus and system for upgrading through multicast in the embodiments of the present invention, the multicast server multicasts information about all subfiles of a current packaged mirror file in the common channel, and multicasts each subfile in a subchannel. Therefore, in the case of upgrading a device that includes multiple systems or modules, the device switches to other subchannels to upgrade other systems or modules after completion of upgrading one system or module, and the multi-system or multi-module device can be upgraded through multicast. Moreover, after monitoring the common channel, the device can switch to the subchannel that bears the subfile required for upgrading through multicast, thus upgrading the single-system or single-module device through broadcast. Meanwhile, because the device can switch between different subchannels to receive different mirror files for upgrade, and can start receiving the files anytime, the time required for upgrading the device is reduced. In the method for upgrading through multicast, the device reports status information to the status server of the multicast server so that the multicast server can track the upgrade status of the device in real time.

DETAILED DESCRIPTION OF THE EMBODIMENTS

To make the technical solution, objectives and merits of the present invention clearer, the following describes the embodiments of the present invention in more detail with reference to accompanying drawings.

The embodiments of the present invention are expounded below. In the embodiments of the present invention, the Status Report Protocol (SRP) is exemplary only. Other protocols such as the Transport Control Protocol/Internet Protocol (TCP/IP) are also applicable.

Figure 1:
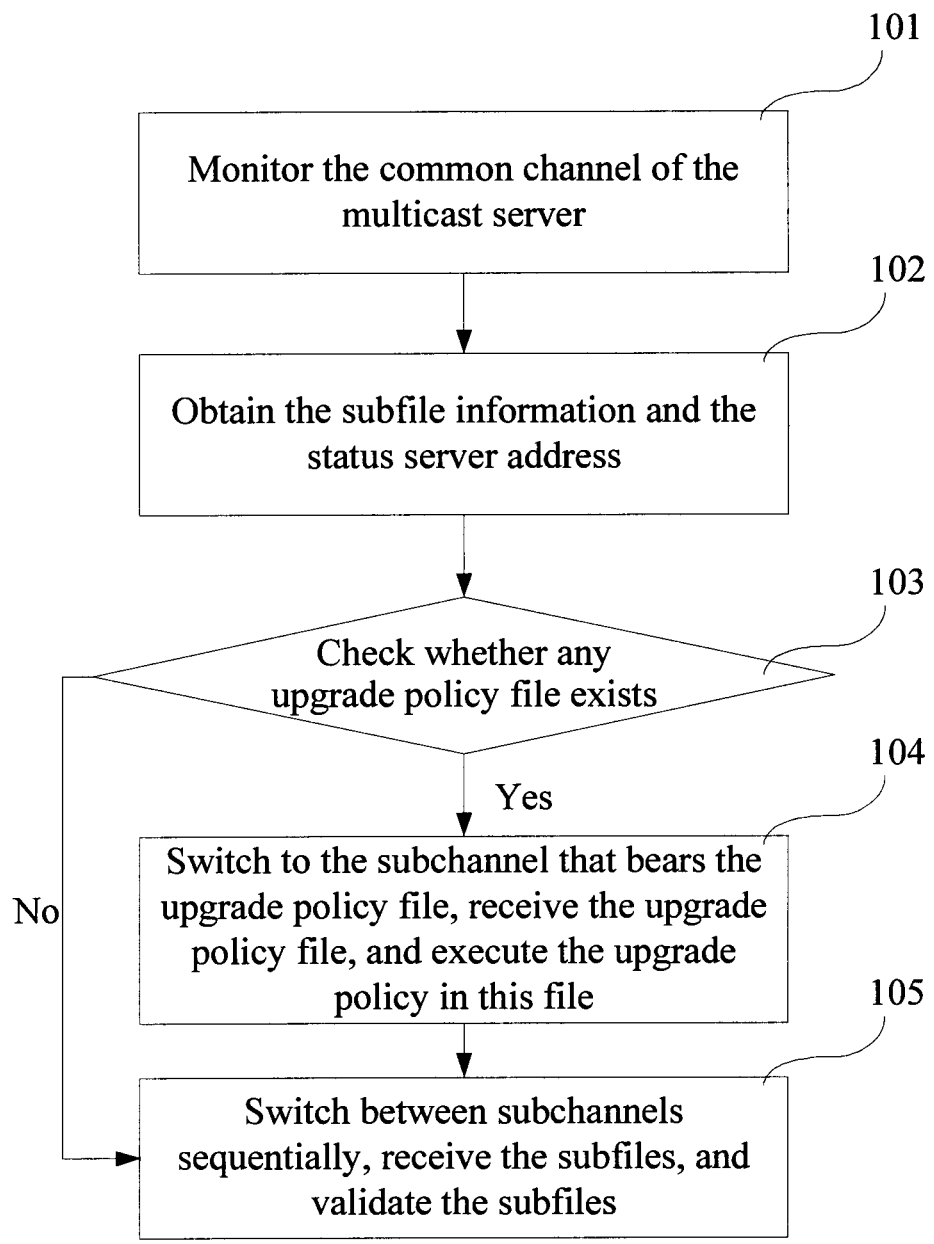
FIG. 1 is a flowchart of a method for upgrading through multicast in an embodiment of the present invention.

As shown in FIG. 1, the method for upgrading through multicast in an embodiment of the present invention can upgrade a multi-system or multi-module device through multicast, and track the upgrade status of the device reliably. In this embodiment, the multicast server multicasts information about all subfiles of the current packaged mirror file through the common channel, and multicasts each subfile through a subchannel. Each subchannel may multicast a single subfile or multiple subfiles. The method in this embodiment includes:

Block 101: The device monitors a common channel of a multicast server.

Generally, the device monitors only the common channel of the multicast server. The device may also monitor subchannels of the multicast server, and, in this case, the address of each subchannel needs to be configured on the device.

The device monitors the common channel to know information about all subfiles in the current packaged mirror file. The information about all subfiles in the current packaged mirror file may be: major release of the current mirror file, product information, SRP server address, number of subfiles, multicast address and multicast port of each subfile, subfile type, subfile length, and subfile version. The current packaged mirror file is composed of a file header and multiple subfiles. Examples of the subfiles are: configuration file, mirror file, upgrade policy file, resource file, and vendor extension file. The common channel of the multicast server uses a general multicast address which is known by all devices. The information about all subfiles of the current packaged mirror file is multicast in the common channel cyclically.

Block 102: The device obtains a subfile information and a status server address.

The device obtains the required subfile information and a Uniform Resource Locator (URL) of the status server from the packets in the common channel. The device determines the mirror files required for upgrading this device and determines the address and port of the subchannel that bears the mirror files according to the packets in the common channel. The device may report the upgrade status of this device to the status server according to the URL of the status server.

In this block, the device does not necessarily obtain the URL of the status server because the multicast server can still upgrade the device without knowing the upgrade status of the device.

Block 103: The device checks whether an upgrade policy file exists. If so, block 104 occurs; if not, block 105 occurs.

The device checks whether an upgrade policy file exists in the current packaged mirror file according to the packets in the common channel. If so, block 104 occurs; if not, block 105 occurs.

Besides, because the upgrade policy file does not necessarily exist, and the device can still be upgraded successfully even if the upgrade policy file does not exist or is not read. Therefore, block 103 is not necessarily performed. The procedure can proceed from block 102 to block 105 directly. However, block 103 makes it more flexible to upgrade the device. For example, block 103 may specify the order of upgrading the systems in the multi-system device, or specify the system which does not need to be upgraded temporarily.

Block 104: The device switches to a subchannel that bears the upgrade policy file, receives the upgrade policy file, and executes the upgrade policy in this file.

When an upgrade policy file exists, the device may determine the address and port of the subchannel that bears the upgrade policy file according to the packets in the common channel. The device switches to the subchannel according to the address and port of the subchannel that bears the upgrade policy file, and receives the upgrade policy file in the subchannel. The upgrade policy file is multicast cyclically in segments. The device may start receiving the file anytime. After the device receives the complete upgrade policy file, the device executes the upgrade policy in the file. The upgrade policy specifies the order of the mirror files for upgrade, the system that needs to be upgraded, or the target version of the upgrade.

Block 105: The device switches between subchannels sequentially, receives the subfiles in the subchannels, and validates the subfiles.

If block 104 has occurred, the device is upgraded in the order of upgrade specified in the upgrade policy file, namely, the device switches between the subchannels sequentially according to the upgrade order in the upgrade policy file as well as the address and the port of the subchannels that bear the subfiles for upgrade, where the address and the port are obtained from the packets in the common channel. The device switches between the subchannels sequentially, receives the subfiles multicast in the subchannels one by one, and validates the subfiles, thus finishing the device upgrade.

If block 104 does not occur, the device switches between the subchannels that bear the subfiles required for upgrading this device in the order of the subchannels indicated in the packets in the common channel, receives the subfiles required for upgrading this device one by one, and validates the subfiles, thus finishing the device upgrade.

Through the foregoing embodiment, the multi-system or multi-module device can be upgraded through multicast. Besides, the device may monitor the packets multicast in the common channel to obtain the address and the port of the subchannel that bears the mirror file for upgrade, and switch to the subchannel directly, thus upgrading the single-system or single-module device through broadcast.

In the conventional art, the multicast server multicasts the mirror file cyclically, but cannot know the upgrade status of the device or know whether the device upgrade is completed, and, in the process of upgrading devices in batches, all devices need to wait for a long time whereupon the upgrade is regarded as completed and the power is interrupted or other operations are performed, but it is actually uncertain whether the powered-off device is upgraded successively or not. In the embodiment of the present invention, if the device knows the URL of the status server in block 102, the device can report the upgrade status information of the device to the status server. Therefore, the multicast server can update the upgrade status of the device in time, and know the latest upgrade status of the device in time. The trigger condition that triggers the device to report the upgrade status to the status server can be set through the SRP protocol flexibly. For example, the upgrade status may be reported before start of the upgrade, and reported again after completion of upgrading all systems; or the upgrade status is reported once a system is upgraded; or the upgrade status is reported at intervals.

The reporting of the upgrade status of the device to the status server also helps the multicast server upgrade the device. If the multicast server knows completion of upgrading the device, the multicast server can start multicasting other files or stop multicasting.

In the foregoing blocks, every multicast packet on a subchannel of the multicast server may have the same composition, namely, may be composed of a multicast packet header and subfile data. The multicast packet header may indicate the length of the current packet, Cyclic Redundancy Checksum (CRC), sequence number of the current packet, total length of the subfile of the current channel, file type, and product information. Therefore, after receiving the multicast packet in the subchannel, the device knows the length of the whole subfile and the sequence number of the current packet according to the packet header of the multicast packet, and can calculate the offset, fill the corresponding position with the data of the current packet, and obtain a complete subfile in the end. Therefore, when receiving the subfile in the subchannel, the device can receive the subfile and complete the upgrade without waiting for a long time.

According to the method provided in the foregoing embodiment, the device can upgrade multi-system or multi-module devices by receiving the subfiles in multiple subchannels sequentially. After one system or module is upgraded, the device switches to the next subchannel to start receiving other upgrade subfiles and upgrade the corresponding system or module, without waiting for a long time. Besides, in the method described above, the status server may update the upgrade status of the device, and the upgrade status of each device can be tracked reliably in real time, and the upgraded device may proceed with other operations or may be powered off to reduce power consumption. In conclusion, the method in the foregoing embodiment can upgrade multi-system or multi-module devices, reduce the time required for upgrade, and acquire the upgrade status of the device.

Figure 2:
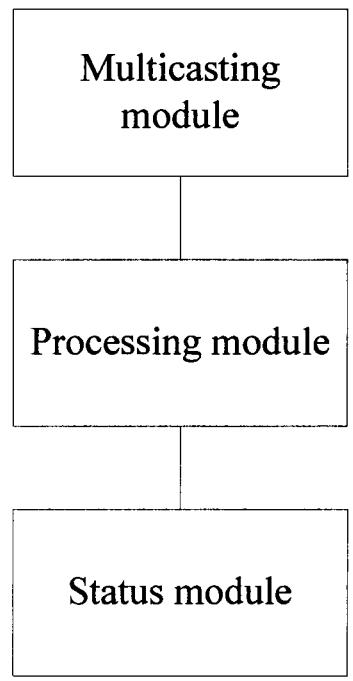
FIG. 2 shows a structure of a multicast server in an embodiment of the present invention.

As shown in FIG. 2, the multicast server in the foregoing embodiment includes a processing module, a multicasting module, and a status module. The multicasting module is adapted to multicast mirror files and other corresponding information. The multicasting module may multicast information through a common channel and subchannels.

The common channel is adapted to multicast the information about all subfiles in the current packaged mirror file. The information about all subfiles in the current packaged mirror file includes: major release of the current mirror file, product information, SRP server address, number of subfiles, multicast address and multicast port of each subfile, subfile type, subfile length, and subfile version.

The subchannels are adapted to multicast subfiles. A subfile includes a multicast packet header and subfile data. The multicast packet header may include the length of the current packet, CRC, sequence number of the current packet, total length of the subfile of the current channel, file type, and product information.

The packaged mirror file is composed of a file header and multiple subfiles. Examples of the subfiles are: configuration file, mirror file, upgrade policy file, resource file, and vendor extension file.

The processing module is adapted to configure the content of packets multicast in the common channel and subchannels of the multicasting module, multicast frequency, and number of segments. Different packets are multicast through different channels of the multicasting module. Each packet needs to be multicast in segments, and the entire packet needs to be multicast cyclically. The processing module is adapted to configure the content multicast in the common channel and subchannels of the multicasting module, multicast frequency, and number of segments of a packet. For example, the processing module configures the common channel to multicast the information about all subfiles in the packaged mirror file, and configures each subchannel to multicast one or more subfiles.

When configuring the subchannel that bears the subfile, the processing module may parse the configuration file, and configure the subfile multicast by the subchannel according to the configuration file. The configuration file may be configured manually through operations on the interface, or may be generated automatically according to the availability of the subchannel detected randomly. When the processing module configures the subchannel that bears the subfile, the processing module may select all subchannels sequentially or randomly without reference to the configuration file. In the selection process, if the address and the port of the selected subchannel are available, the processing module allocates a subfile to this subchannel; otherwise, the processing module goes on to select the next subchannel.

Besides, if a status module exists, the processing module is further adapted to configure the SRP protocol, and set the condition for triggering the device to report the upgrade status to the status server. For example, the upgrade status may be reported before start of the upgrade, and reported again after completion of upgrading all systems; or the upgrade status is reported once a system is upgraded; or the upgrade status is reported at intervals.

The status module is adapted to track the upgrade status of the device. The status module acquires the latest upgrade status of the device one the basis of the status information reported by the device and other device information, and the device reports the upgrade status according to the SRP protocol.

The processing module is further adapted to decide whether to start multicasting other files or stop multicasting according to the device upgrade status obtained by the status module.

Figure 3:
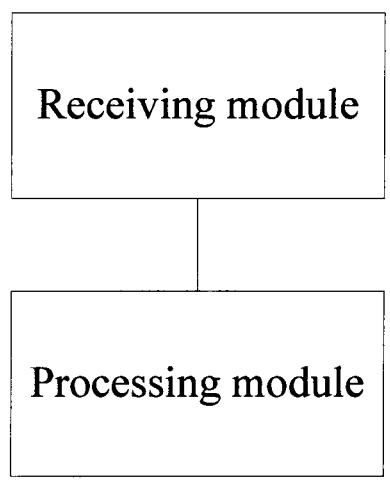
FIG. 3 shows a structure of a device in an embodiment of the present invention.

As shown in FIG. 3, the device in the foregoing embodiment includes a receiving module and a processing module.

The receiving module is adapted to receive multicast packets in a common channel and subchannels. The processing module is adapted to: obtain the address and the port of the subchannel that bears the required subfile from the multicast packets in the common channel; judge whether an upgrade policy file exists; switch to the subchannel that bears the upgrade policy file if the upgrade policy file exists, and receive the upgrade policy file through the receiving module; execute the upgrade policy file, switch between subchannels sequentially, and receive the packets multicast in the subchannels through the receiving module; and validate the received mirror file for upgrade.

The device further includes a sending module, which is adapted to send the upgrade status of this device to the status server of the multicast server. The processing module is adapted to send the upgrade status of this device through the sending module according to the settings of the multicast server.

Figure 4:
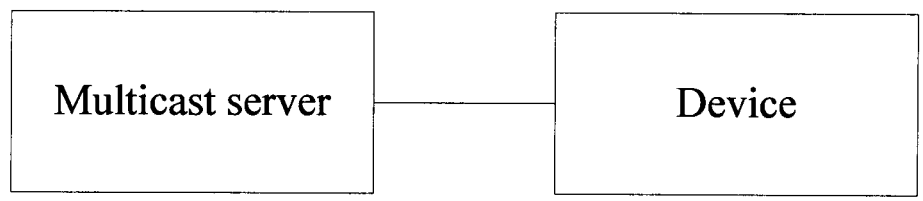
FIG. 4 shows a system for upgrading through multicast in an embodiment of the present invention.

As shown in FIG. 4, a system in the foregoing embodiment includes a multicast server and a device. The multicast server is adapted to multicast the current packaged mirror file through a common channel and subchannels, and acquire the upgrade status of the device.

The multicast server is adapted to multicast the information about all subfiles in the current packaged mirror file through the common channel. The information about all subfiles in the current packaged mirror file includes: major release of the current mirror file, product information, SRP server address, number of subfiles, multicast address and multicast port of each subfile, subfile type, subfile length, and subfile version. The packets in the common channel are multicast cyclically in segments.

The multicast server is further adapted to multicast the subfiles in the current packaged mirror file through a subchannel. Examples of the subfiles are: configuration file, mirror file, upgrade policy file, resource file, and vendor extension file. When the multicast server multicasts subfiles through subchannels, each subchannel may be used to multicast only one subfile. A subfile includes a multicast packet header and subfile data. The multicast packet header may include the length of the current packet, CRC, sequence number of the current packet, total length of the subfile of the current channel, file type, and product information. The packet in the subchannel is multicast cyclically in segments.

The multicast server is adapted to configure the subchannel that bears the multicast packets according to the configuration file, or configure the subchannels that bear the multicast packets randomly or sequentially. The multicast server is further adapted to configure the multicast frequency and the number of segments. The configuration file and the method of configuring subchannels randomly or sequentially are described in the foregoing embodiment.

The multicast server is further adapted to acquire the upgrade status of the device on the basis of the status information reported by the device and other device information.

The multicast server is further adapted to configure the SRP protocol and set the condition for triggering the device to report the upgrade status to the status server. For example, the upgrade status may be reported before start of the upgrade, and reported again after completion of upgrading all systems; or the upgrade status is reported once a system is upgraded; or the upgrade status is reported at intervals.

The device is adapted to: monitor the common channel of the multicast server; and obtain information about the corresponding subfiles according to the packets in the common channel. The information about the subfile includes information about all subfiles in the current packaged mirror file, and the address and port of the subchannels that bear the subfiles. The device is further adapted to: check whether an upgrade policy file exists in the current packaged mirror file according to the packets in the common channel of the multicast server; switch to the subchannel that bears the upgrade policy file according to the subchannel address and port obtained from the packets of the common channel if the upgrade policy file exists, and receive the upgrade policy file, and execute the upgrade policy in the upgrade policy file; switch sequentially between subchannels that bear the subfiles for upgrade in the order of the subchannels in the packets of the common channel if no upgrade policy file exists. The device is further adapted to validate the received subfile and finish device upgrade. The device is further adapted to report the latest upgrade status to the server in the whole upgrade process so that the multicast server can update the upgrade status conveniently.

Although the invention is described through some preferred embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for upgrading a device through multicast, wherein the device comprises multiple systems or modules, and wherein the method comprises:

monitoring, by the device, a common channel of a multicast server, wherein information about all subfiles of a current packaged mirror file is multicast in the common channel by the multicast server;

obtaining, by the device, information about subfiles required for upgrading the multiple systems or modules of the device from packets in the common channel, wherein the information comprises addresses of subchannels that bear the subfiles on the multicast server;

switching, by the device, to the subchannels sequentially according to the addresses of the subchannels that bear the subfiles required for upgrading the multiple systems or modules of the device;

receiving, by the device, the subfiles multicast in the subchannels; and validating the subfiles.

2. The method according to claim 1, wherein switching, by the device, to the subchannels comprises switching, by the device, sequentially between subchannels that bear the subfiles required for upgrade in order of the subchannels in the packets of the common channel when it is determined that no upgrade policy file exists according to the packets in the common channel.

3. The method according to claim 1, wherein an upgrade policy file exists, and wherein the method for upgrading the device through multicast further comprises switching, by the device, to a subchannel that bears the upgrade policy file according to subfile information obtained from the packets of the common channel, receiving, by the device, the upgrade policy file, executing, by the device, an upgrade policy in the file, and switching, by the device, between the subchannels sequentially according to upgrade order specified in the upgrade policy.

4. The method according to claim 1, further comprising, obtaining, by the device, an address of a status server of the multicast server from the packets of the common channel when obtaining the information about the subfiles from the packets of the common channel.

5. The method according to claim 4, further comprising, reporting, by the device, status information to the status server according to the obtained address of the status server.

6. A non-transitory computer-readable medium comprising instructions, which, when executed by a computer, cause the computer to perform a method for upgrading a device through multicast, wherein the device comprises multiple systems or modules, and wherein the method comprises:

multicasting packets through a common channel and subchannels;

configuring content of the packets multicast in the common channel and the subchannels:

configuring the common channel to multicast information about all subfiles of a current packaged mirror file; and configuring the subchannels to multicast the subfiles required for upgrading the multiple systems or modules of the device.

7. The non-transitory computer-readable medium according to claim 6, wherein the method further comprises configuring the subfiles multicast by the subchannels according to a configuration file, or selecting a subfile multicast by the subchannels sequentially or randomly.

8. The non-transitory computer-readable medium according to claim 6, wherein the method further comprises configuring a multicast frequency and/or number of segments.

9. The non-transitory computer-readable medium according to claim 6, wherein the method further comprises acquiring upgrade status of a device by receiving status information reported by the device.

10. The non-transitory computer-readable medium according to claim 9, wherein the method further comprises setting a condition that triggers the device to report the status information and multicasting the condition.

11. The non-transitory computer-readable medium according to claim 9, wherein the method further comprises multicasting subsequent packets or stopping multicasting according to the upgrade status.

12. A non-transitory computer-readable medium comprising instructions, which, when executed by a computer, cause the computer to perform a method, wherein the method comprises:

receiving multicast packets in a common channel and subchannels;

obtaining addresses and ports of subchannels that bear the subfiles required for updating multiple systems or modules of a device from the multicast packets in the common channel;

switching to the subchannels sequentially;

receiving the multicast packets in the subchannels; and validating a received mirror file for upgrade.

13. The non-transitory computer-readable medium according to claim 12, wherein, the method further comprises switching between the subchannels sequentially according to an order of the subchannels indicated in the packets multicast by the common channel when no upgrade policy file exists.

14. The non-transitory computer-readable medium according to claim 12, wherein the method further comprises:

confirming existence of an upgrade policy file;

switching to a subchannel that bears the upgrade policy file;

receiving the upgrade policy file through the receiving module;

executing the upgrade policy file; and switching between the subchannels sequentially in order specified in the upgrade policy file.

15. The non-transitory computer-readable medium according to claim 12, wherein the method further comprises:

sending upgrade status of the device to a status server of the multicast server; and sending the upgrade status of the device according to settings of a multicast server.

16. A non-transitory computer-readable medium comprising instructions, which, when executed by a computer, cause the computer to perform a method, wherein the method comprises:

monitoring a common channel of a multicast server;

obtaining information about subfiles required for upgrading multiple systems or modules of a device from packets in the common channel;

switching to subchannels that bear the subfiles according to the information about the subfiles;

receiving the subfiles in the subchannels; and validating the subfiles.

17. A non-transitory computer-readable medium comprising instructions, which, when executed by a computer, cause the computer to perform a method, wherein the method comprises:

multicasting a current packaged mirror file;

multicasting information about all subfiles of the current packaged mirror file through a common channel of a multicast server; and multicasting the subfiles required for upgrading the multiple systems or modules of a device through subchannels of the multicast server.

18. The method according to claim 1, wherein the method further comprises switching to a next one of the subchannels to upgrade a next one of the multiple systems or modules of the device after a previous one of the multiple systems or modules of the device is upgraded.

19. The method according to claim 1, wherein the information about all the subfiles of the current packaged mirror files multicast in the common channel by the multicast server comprises product information, multicast address and multicast port information of each of the subfiles, subfile types, subfile lengths, and subfile version information.

20. The method according to claim 1, wherein the subfiles required for upgrading the multiple systems or modules of the device comprise a configuration file, a mirror file, an upgrade policy file, a resource file, and a vendor extension file.

* * * * *

UNITED STATES PATENT AND TRADEMARK OFFICE
CERTIFICATE OF CORRECTION

| | |
|---|---|
| PATENT NO. | : 8,484,318 B2 |
| APPLICATION NO. | : 13/052566 |
| DATED | : July 9, 2013 |
| INVENTOR(S) | : Xiaotian Zhang and Junxia Xu |

Page 1 of 1

It is certified that error appears in the above-identified patent and that said Letters Patent is hereby corrected as shown below:

On Title page 2 in References Cited under Other Publications,

Column 2, lines 1-3 should read -- Extended European Search Report dated (mailed) Jan. 23, 2012, issued in related Application No. 09814024.7-2416, PCT/CN2009073640, Huawei Technologies Co., Ltd. --

Column 2, lines 6-8 should read -- First Chinese Office Action dated (mailed) Feb. 28, 2011, issued in related Chinese Application No. 200810216303.1, Huawei Technologies Co., Ltd. --

Signed and Sealed this
Twentieth Day of August, 2013

Teresa Stanek Rea
*Acting Director of the United States Patent and Trademark Office*